United States Patent
Benne et al.

(10) Patent No.: US 8,413,933 B2
(45) Date of Patent: Apr. 9, 2013

(54) PIPE-SUSPENSION BRACKET

(75) Inventors: Leonard Theodoor Benne, Gouda (NL); Raymond Vonk, Nieuwegein (NL)

(73) Assignee: Flamco B.V., Gouda (NL)

( * ) Notice: Subject to any disclaimer, the term of this patent is extended or adjusted under 35 U.S.C. 154(b) by 0 days.

(21) Appl. No.: 13/144,201

(22) PCT Filed: Jan. 15, 2010

(86) PCT No.: PCT/NL2010/000006
§ 371 (c)(1),
(2), (4) Date: Aug. 22, 2011

(87) PCT Pub. No.: WO2010/082818
PCT Pub. Date: Jul. 22, 2010

(65) Prior Publication Data
US 2011/0290948 A1    Dec. 1, 2011

(30) Foreign Application Priority Data
Jan. 16, 2009   (NL) .................................... 2002420

(51) Int. Cl.
*F16L 3/00* (2006.01)
(52) U.S. Cl. .............. 248/62; 248/71; 248/72; 248/74.1
(58) Field of Classification Search ............ 248/49, 248/58–63, 65, 67.7, 71, 73, 74.2, 74.4, 228.4, 248/74.1
See application file for complete search history.

(56) References Cited

U.S. PATENT DOCUMENTS

| | | | | |
|---|---|---|---|---|
| 1,245,047 | A | * | 10/1917 | Sherman .......................... 248/72 |
| 2,931,605 | A | * | 4/1960 | Kelly ............................... 248/59 |
| 3,208,560 | A | * | 9/1965 | Cote ............................. 403/252 |
| 5,108,055 | A | * | 4/1992 | Kreinberg et al. .............. 248/71 |
| 5,133,523 | A | * | 7/1992 | Daigle et al. .................... 248/62 |
| 5,251,857 | A | * | 10/1993 | Grice et al. ..................... 248/62 |
| 6,978,973 | B1 | * | 12/2005 | Gretz .......................... 248/74.1 |
| 7,621,488 | B2 | * | 11/2009 | Miller ............................. 248/71 |

FOREIGN PATENT DOCUMENTS

| | | |
|---|---|---|
| CH | 684114 A5 | 7/1994 |
| DE | 3309758 A1 | 9/1984 |
| DE | 9214153 U1 | 12/1992 |
| DE | 9309869 U1 | 11/1994 |
| EP | 1018681 A1 | 7/2000 |
| EP | 1411286 A1 | 4/2004 |
| WO | 2008143501 A1 | 11/2008 |

* cited by examiner

*Primary Examiner* — Gwendolyn W Baxter
(74) *Attorney, Agent, or Firm* — Hoffman & Baron, LLP

(57) ABSTRACT

A bracket (10) includes a body (14) for receiving the pipe and a suspension part (16) connected to the body for suspending a pipe from a profile (12) in several different ways. The suspension part includes an overlie part (18) having a bridge part (22) and two leg-parts (20,21). The bridge part extends between the two leg-parts and includes at least one resting section (49) being constructed to rest on an upper surface of the profile. The leg parts are constructed to extend on either side of the profile. A projection (45) is formed on the bridge part and a hole (50) is formed in bridge part.

12 Claims, 4 Drawing Sheets

PIPE-SUSPENSION BRACKET

CROSS-REFERENCE TO RELATED APPLICATIONS

This application is the National Stage of International Application No. PCT/NL2010/000006, filed Jan. 15, 2010, which claims the benefit of Netherlands Application No. 2002420, filed Jan. 16, 2009, the contents of which is incorporated by reference herein.

FIELD OF THE INVENTION

The present invention relates to a pipe-suspension bracket for suspending a pipe from a profile. The invention further relates to a method of manufacturing the pipe-suspension bracket. Pipe-suspension brackets are known.

DESCRIPTION OF THE PRIOR ART

In the prior art, several different pipe-suspension brackets are known. EP1411286 discloses a pipe-suspension bracket for suspending a pipe 2 from a profile 3. The pipe-suspension bracket is also configured to be mounted via a rod 11 from a roof.

A disadvantage of this pipe-suspension bracket is that it is not very versatile and is limited in its application.

WO2008143501A1 discloses another pipe-suspension bracket. The pipe-suspension bracket comprises an inverted U-shape which fits over a profile 40. The pipe-suspension bracket further has a hole 13a for inserting a threaded rod.

The suspension bracket of WO2008143501A1 has a same disadvantage as the bracket of EP1411286 in that it is not very versatile.

DE9214153U1 and EP1018618 also disclose pipe suspension brackets which are not very versatile.

OBJECT OF THE INVENTION

It is an object of the invention to provide an alternative to the prior art.

It is another object of the invention to provide a versatile pipe-suspension bracket.

SUMMARY OF THE INVENTION

At least one object is achieved in a pipe-suspension bracket comprising a body for receiving the pipe and a suspension part connected to the body for suspending a pipe from a profile in several different ways, the suspension part comprising:

an overlie part comprising a bridge part and two leg-parts, the bridge part extending between the two leg-parts and comprising at least one resting section being constructed to rest on an upper surface of the profile and the leg parts constructed to extend on either side of the profile, the overlie part being configured to substantially fit over the profile for suspending the pipe from the profile in one way, and a projection formed on the bridge part for suspending the pipe in another way, the projection being formed to substantially fit in a slot which is formed in the profile by two ridges of the profile, and a hole formed in the bridge part, the hole being configured to suspend the pipe-suspension bracket from the profile via a suspension rod for suspending the pipe in yet another way.

Due to the overlie part, the projection and the hole, the present invention allows suspension of pipes from a profile in at least three different ways.

In a first way, the overlie part is positioned over the profile in such a way that the profile substantially fits in the overlie part. The body of the pipe-suspension bracket is positioned under the rail and can hold the pipe. The resting section may be a portion of the bridge part. The resting section rests no the profile In a second way, the projection can be fitted in a slot of a profile which has ridges. The ridges may project horizontally from vertical sidewalls of the profile and define the slot. The body of the pipe-suspension bracket is positioned underneath the rail and can hold the pipe. Due to the fact that the hole is formed in the bridge part, it is easy to tightly fix the pipe-suspension bracket against the profile by for instance providing a T-bolt in the hole. A part of the upper surface of the bridge part is configured to form an abutment surface for abutment against the underside of the ridges of the profile. The ridges of the profile are tightly wedged between the abutment surface of the bridge part and for instance a bolt which is provided in the hole. Thus, any tolerance in a direction perpendicular to the profile can simply be avoided.

This is very difficult if not impossible with the suspension brackets of DE9214153U1 and EP1018618, because these suspension brackets do not have a hole in the bridge part, but have a hole in a nut which is attached on top of the bridge part. See nut 2d in FIG. 1 of DE9214153U1. Because the nut 2d has a substantial thickness, the hole is provided at a substantial distance from an upper surface of the bridge part. Because the nut 2d will generally be thicker than the thickness of a rim of a profile, it is difficult to wedge the suspension brackets of DE9214153U1 and EP1018618 tightly against a profile by using the nut as a projection and positioning the nut in the slot. A complicated bolt would then be required to avoid tolerance between the suspension bracket and the rail. The nut 2d of the suspension bracket of DE9214153U1 (and the nut of EP1018618) is therefore not suitable to be used as a projection for insertion in a slot of a profile.

In a third way, one end of a suspension rod can be inserted in the hole and thus be connected to the pipe-suspension bracket. The connection may be made by screwing a threaded rod in the hole or simply using a nut or bolt or a different kind of connection for securing the rod. The other end may be connected to the profile, for instance via a click-in device or via a slider which also has a hole. The upper end of the rod may also simply be connected to another object via a nut.

The pipe-suspension bracket of the invention has a simple design, allowing cost-effective production.

A skilled person will understand that the word "profile" should be interpreted broadly. The profile may be a rail. However, the overlie part can also be fitted over a beam or rod. The hole in the projection can be used to suspend the pipe-suspension bracket via a suspension rod directly from a ceiling of from a different object.

In an embodiment, the bridge part is formed by a substantially horizontal strip, and the projection comprises an elevated part of the substantially horizontal strip.

This embodiment allows a simple product and cost-effective manufacture. The non-elevated part of the bridge part may form the resting section. If the elevation of the projection above the resting section is limited, an upper surface of the resting section may form an abutment surface which is configured to engage an underside of the profile. This allows the pipe suspension bracket to be tightly wedged against the profile in a simple fashion. Thus, any tolerance in a vertical direction can be avoided, contrary to the embodiment of FIG. 1 of DE9214153U1.

In one embodiment, the overlie part is an inverted, substantially U-shaped or C-shaped part. This allows easy connection with a profile having a substantially U-shaped or C-shaped form.

In a suitable embodiment, the hole is provided in the projection. This allows the projection to be relatively small in that the projection and the hole do not each require individual space on the bridge part, but make use of the same space on the bridge part.

In another embodiment, the projection comprises fitting edges configured to fit substantially closely in a slot of a profile, in such a way that the pipe-suspension bracket is substantially prevented from rotation and substantially fixed in a predetermined orientation relative to the profile.

In this way, the orientation of the pipe relative to the rail can be secured.

In one embodiment, the projection comprises at least two fitting edges configured to position the pipe parallel with the profile. Often, the pipe is to be suspended from the rail at multiple points and thus should extend underneath the rail and parallel to the rail. Then, the fitting edges keep the pipe in the required orientation.

In another embodiment, the projection comprises four, six or more fitting edges, such that the pipe or pipeline may be provided in two, three or more different orientations relative to the pipe or pipeline. In this, way, the pipe-suspension bracket provides extra options for suspending the pipe.

In another embodiment, the hole is configured to cooperate with a threaded rod, wherein the hole is configured to form a connection with one end of the threaded rod in order to suspend the pipe-suspension bracket via the threaded rod.

The threaded rod is a very simple way of attaching the pipe-suspension bracket to a rail or a ceiling. With the rod the pipe may be suspended from the profile at a slope, by providing rods with a different length along the pipe.

The present invention further relates to a combination of the pipe-suspension bracket and:
   a) a rod comprising at least one threaded end, or
   b) a T-bolt, or
   c) a bolt and a T-nut,
for connection of the pipe suspension bracket with the profile. The connection methods according to the invention provide a simple connection mechanism. The T-bolt and T-nut connection of sub b) and c) advantageously allow a sliding connection between the rail and the pipe-suspension bracket.

The invention further relates to a method of manufacturing the pipe-suspension bracket, the method comprising: providing a strip of material and forming a body for receiving the pipe and a suspension part connected to the body for suspending a pipe from a profile in several different ways, wherein the suspension part is formed in such a way that it comprises:
   an overlie part comprising a bridge part and two leg-parts, the bridge part extending between the two leg-parts and comprising at least one resting section being constructed to rest on an upper surface of the profile and the leg parts constructed to extend on either side of the profile, the overlie part being configured to substantially fit over the profile for suspending the pipe from the profile in one way, and
   a projection formed on the bridge part, the projection being formed to substantially fit in a slot which is formed in the profile by two ridges of the profile for suspending the pipe in another way, and
   a hole formed in the bridge part, the hole being configured to suspend the pipe-suspension bracket from the profile via a suspension rod for suspending the pipe in yet another way.

BRIEF DESCRIPTION OF THE DRAWINGS

The objects and features of the present invention will become more apparent, and the invention itself will be best understood from the following detailed description of the present invention when read with reference to the accompanying drawings.

DETAILED DESCRIPTION OF THE INVENTION

Figure 9:
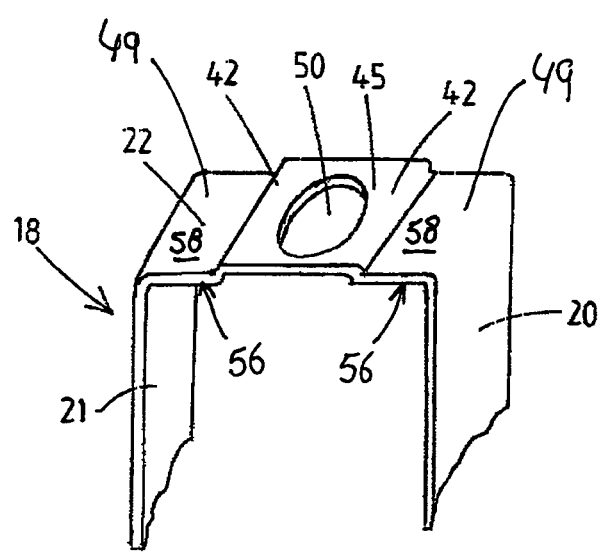
FIG. 9 shows a partial, enlarged view of the pipe-suspension bracket.

FIGS. 1-4, and in enlarged view FIG. 9, show a pipe-suspension bracket 10 according to the invention, and a rail 12 (also indicated as profile). The pipe-suspension bracket 10 is manufactured primarily from a metal strip 11, preferably steel. However, other materials are also possible.

The pipe-suspension bracket 10 comprises a body 14 and a suspension part 16. The body 14 and the suspension part 16 are integral with one another. The body is mainly a circular, ring-shaped body configured to receive the pipe which is to be suspended. However, it is also possible that for pipes 30 having different forms than circular, a matching form of the body 14 is provided.

The suspension part 16 comprises an overlie part in the form of a U-shaped part 18 which is inverted. The U-shaped part 18 is formed by a first vertical strip 20 and a second vertical strip 21 and a substantially horizontal strip or bridge part 22 bridging the distance between the vertical strips 20, 21. The vertical strips 20, 21 form the legs of the overlie part and the substantially horizontal strip 22 forms the bridge part. Other forms than U-shapes are also possible, in combination with profiles having other forms, such as a circular profile. In such a case, the bridge part may be a part of a circle and may go over in the leg parts.

A projection 45 is provided on the bridge part 22 of the U-shaped part 18. The projection 45 is an elevated section of the bridge part 22. A hole 50 is provided in the horizontal strip 22 of the inverted U-shaped art 18. The hole 50 is provided in the projection 45. The hole 50 may be provided with thread. The thread allows easy fastening with a threaded rod. For instance, an M10 thread may be provided. The bridge part 22 further comprises non-elevated sections 49, which form resting sections 49 via which the suspension bracket can rest on the rail 12.

The body 14 of the pipe-suspension bracket 10 comprises a lid part 24 which is pivotable about a hinge 26. A fastening member 28 is provided in order to close the lid part 24. Holes 29 are provided in the vertical strips 20, 21 for accomodating the closure member 28. The fastening member 28 may be a bolt. The fastening member 28 performs two functions at the same. First, it closes the lid part 24, thereby securing the pipe 30 inside the body 14. Second, the fastening member 28 secures the pipe-suspension bracket 10 to the rail 12.

In a first way of use, the U-shaped part 18 is positioned over a rail or profile 12. The body 14 is positioned underneath the rail 12.

The rail 12 comprises a first side wall 34 and a second side wall 36 interconnected by an upper wall 38. The rail further comprises a first ridge 40 connected to the first side wall 34 and a second ridge 41 connected to the second side wall 36. The ridges 40, 41 define a slot 43 between them. The ridges 40, 41 may extend horizontally and project towards one another. The ridges 40, 41 define a lower surface 60 of the rail 12 which forms an abutment surface for an upper surface of the bridge part.

The non-elevated sections 49 form resting sections. via which the suspension bracket rests on the rail 12 in the first way of use. In particular the underside of the resting sections 49 forms the resting surface.

The rail 12 further comprises a series of holes 39 in the upper wall 38.

The profile 12 may be a substantially square or rectangular form when viewed in cross-section. In this way the inverted U-form 18 fits closely over the profile 12.

It is also possible that the profile has a circular form or is oval shaped.

In that case the bridge part 22 has a form which is different than an inverted U-form, and which substantially corresponds to the form of the rail 12.

Figures 1, 2, 3, 4:
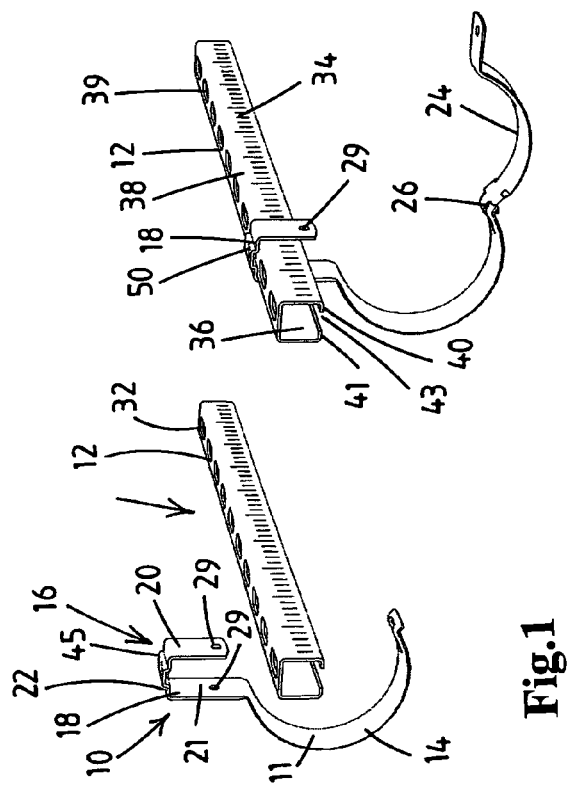
FIGS. 1-4 provide diagrammatic views of the pipe-suspension bracket in a first way of suspending a pipe.
Figure 7:
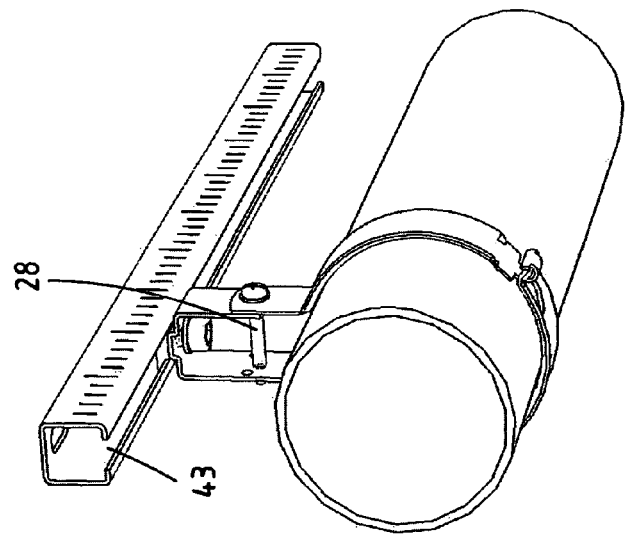
FIGS. 5-7 provide diagrammatic views of the pipe-suspension bracket in a second way of suspending a pipe.
Figure 6:
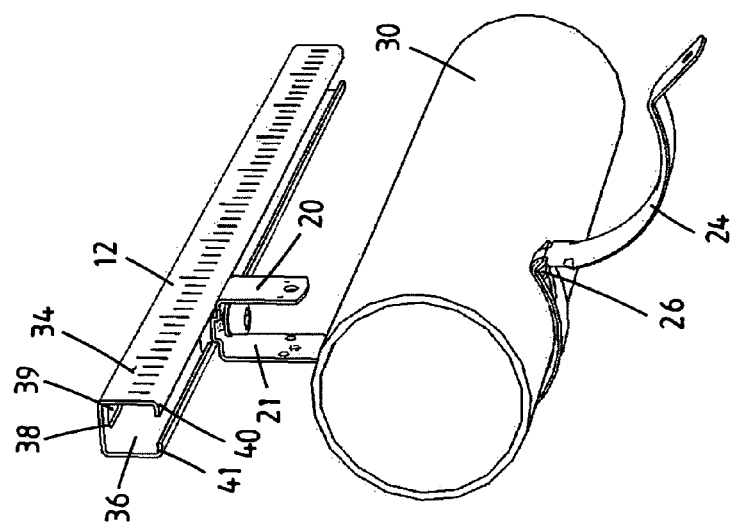
Figure 5:
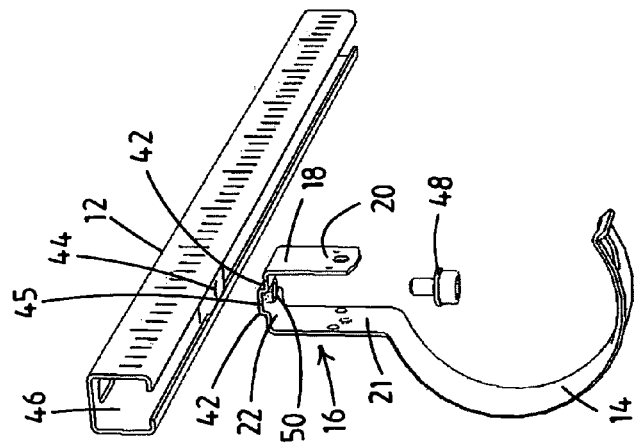

Turning to FIGS. 5-7 a second way of suspending the pipe-suspension bracket from the rail 12 is shown. For this second way, use is made of a projection 45 which is provided in the bridge part 22 of the U-shaped part 18.

The projection 45 is an elevated part of the horizontal strip 22. The projection 45 may have a square or rectangular form when viewed from the top of the bracket and is provided by two folds in the metal strip.

Turning to FIG. 9, it is shown that on either side of the elevated part 45, non elevated parts 49 are provided. The non-elevated parts 49 form resting sections. One side 56 of the non-elevated parts 49 serves as a resting surface via which the overlie part rests on the profile in the first way of suspension. An opposite side 58 forms an abutment surface with which the suspension bracket abuts the ridges 40, 41 of the profile 12.

The two folds form fitting edges 42 which fit inside the slot 43. The fitting edges 42 cause the pipe-suspension bracket 10 to be substantially fixed in terms of rotation about a vertical axis when suspended from the rail 12.

The projection 45 may also have four, six or more fitting edges 42 in order to provide more alternatives for the orientation of the pipe relative to the rail 12.

In an alternative embodiment (not shown), the projection 45 may be circular.

In order to make the connection, a slider 44 is provided in a cavity 46 formed in the rail. The slider 44 rests on the ridges 40, 41.

This embodiment allows the pipe-suspension bracket 10 to slide through the slot 43, but prevents the pipe-suspension bracket 10 to rotate.

Many different slider elements are known in the field of the art, such as a click-nut device, which allows easy fastening of the pipe-suspension bracket 10 to the slider 44. A screw or bolt 48 may be required for the connection between the pipe-suspension bracket 10 and the slider 44. The screw 48 is inserted into the slider 44 through the hole 50 which is provided in the upper wall 22 of the inverted U-shaped art 18.

The slider 44 is a T-head nut which has a thread which makes a firm connection with the bolt 48.

In an alternative embodiment (not shown), the slider 44 is a T-head bolt or a hammer-head bolt. The T-head bolt or hammer-head bolt is provided with a thread which forms a connection with the thread in the hole 50.

Figure 8:
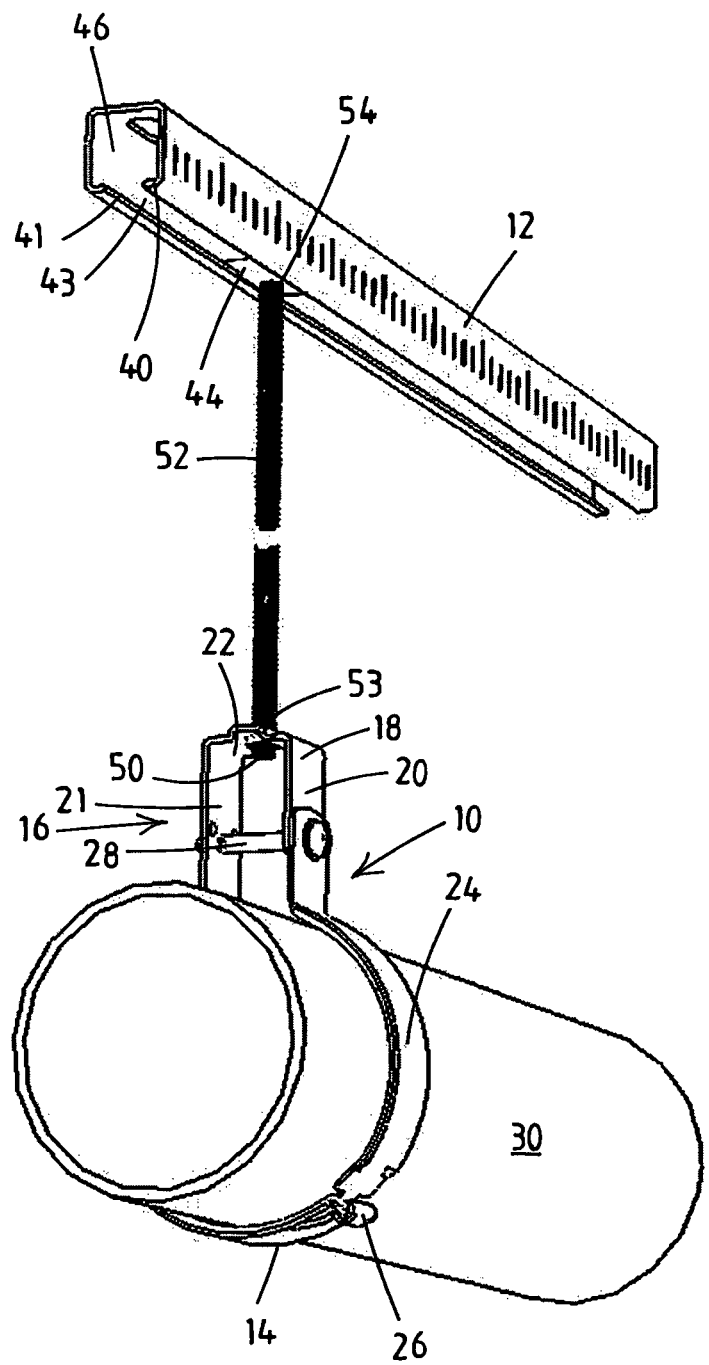
FIG. 8 provides a diagrammatic view of the pipe-suspension bracket in a third way of suspending a pipe.

Turning to FIG. 8, a third way of connecting the pipe-suspension bracket 10 to the rail 12 is shown. Use is made of the hole 50.

A rod 52 comprising opposite ends 53, 54 is provided. The ends 53, 54 are provided with thread. The lower end 53 is screwed into the hole 50. The thread of the rod 52 engages the thread of the hole 50 and forms a solid connection. The upper end 54 is screwed into the slider 44. In this way, the pipe 30 can be suspended at a distance below the rail 12.

The rod 52 serves as a spacing member for positioning the pipe at a distance from a ceiling or rail 12.

In one embodiment (not shown), the suspension part 16 and the ring-shaped body 14 can be disconnected from one another via a detachable connection.

The pipe may be any pipe for any medium, such as water, air, steam, sewer pipe, heating water or any other medium.

It is also possible that the body 14 comprises two half-bodies (not shown) which are detachable from one another.

Ridges may be provided in or on the strip 11 for extra strength or stiffness.

Although the present invention has been shown and described with reference to preferred embodiments, such are merely illustrative of the present invention and are not to be construed as to be limited to the disclosed embodiments and/or details thereof, and the present invention includes all further modifications, variations and/or ultimate embodiments within the spirit and scope of the present invention as defined by the appended claims.

The invention claimed is:

1. A pipe-suspension bracket comprising a body for receiving a pipe and a suspension part connected to the body for suspending the pipe from a profile in several different ways, the suspension part comprising:
   an overlie part comprising a bridge part and two leg-parts, the bridge part extending between the two leg-parts and comprising at least one resting section being constructed to rest on an upper surface of the profile and the leg parts constructed to extend on either side of the profile, wherein the overlie part is configured to substantially fit over the profile for suspending the pipe from the profile in one way,
   a projection formed on the bridge part, the projection being formed to substantially fit in a slot which is formed in the profile by two ridges of the profile for suspending the pipe in another way, and
   a hole formed in the bridge part, the hole being configured to suspend the pipe-suspension bracket from the profile via a suspension rod for suspending the pipe in yet another way.

2. The pipe-suspension bracket of claim 1, wherein the overlie part is an inverted, substantially U-shaped or C-shaped part.

3. The pipe-suspension bracket of claim 1, wherein the hole is provided in the projection.

4. The pipe-suspension bracket of claim 1, wherein the projection comprises fitting edges configured to fit substantially closely in a slot of the profile, in such a way that the pipe-suspension bracket is substantially prevented from rotation and substantially fixed in a predetermined orientation relative to the profile.

5. The pipe-suspension bracket of claim 1, wherein the projection comprises at least two fitting edges configured to position the pipe parallel with the profile.

6. The pipe-suspension bracket of claim 1, wherein the projection comprises four, six or more fitting edges, such that the pipe or pipeline may be provided in two, three or more different orientations relative to the pipe or pipeline.

7. The pipe-suspension bracket of claim 1, wherein the hole is configured to cooperate with the threaded rod, wherein the hole is configured to form a connection with one end of the threaded rod in order to suspend the pipe-suspension suspension bracket via the threaded rod.

8. The pipe-suspension bracket of claim 1, wherein the hole is provided with thread.

9. The pipe-suspension bracket of claim 1, wherein the bridge part is formed by a substantially horizontal strip, and the projection comprises an elevated part of the substantially horizontal strip.

10. The pipe-suspension bracket of claim 1, wherein the bridge part comprises a non-elevated part which forms the resting section.

11. A combination of the pipe-suspension bracket of claim 1, and:
   a) the rod comprising at least one threaded end, or
   b) a T-bolt, or
   c) a bolt and a T-nut,
   for connection of the pipe suspension bracket with the profile.

12. A method of manufacturing a pipe-suspension bracket, the method comprising providing a strip of material and forming a body for receiving a pipe and a suspension part connected to the body for suspending a pipe from a profile in several different ways, wherein the suspension part is formed in such a way that it comprises:
   an overlie part comprising a bridge part and two leg parts, the bridge part extending between the two leg-parts and comprising at least one resting section being constructed to rest on an upper surface of the profile and the leg-parts constructed to extend on either side of the profile, wherein the overlie part is configured to substantially fit over the profile for suspending the pipe from the profile in one way,
   a projection formed on the bridge part, the projection being formed to substantially fit in a slot which is formed in the profile by two ridges of the profile for suspending the pipe in another way, and
   a hole formed in the bridge part, the hole being configured to suspend the pipe-suspension bracket from the profile via a suspension rod for suspending the pipe in yet another way.

* * * * *